US010059220B2

(12) United States Patent
Ro

(10) Patent No.: US 10,059,220 B2
(45) Date of Patent: Aug. 28, 2018

(54) ELECTRIC TRANSFER APPARATUS AND CONTROL METHOD THEREOF

(71) Applicant: SAMSUNG SDI CO., LTD., Yongin-si, Gyeonggi-do (KR)

(72) Inventor: Hun Tae Ro, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 192 days.

(21) Appl. No.: 14/956,606

(22) Filed: Dec. 2, 2015

(65) Prior Publication Data

US 2016/0332532 A1    Nov. 17, 2016

(30) Foreign Application Priority Data

May 11, 2015   (KR) .......................... 10-2015-0065555

(51) Int. Cl.

| | |
|---|---|
| *B60L 11/18* | (2006.01) |
| *H02J 7/00* | (2006.01) |
| *H02J 7/34* | (2006.01) |
| *H02J 9/00* | (2006.01) |
| *H02J 9/06* | (2006.01) |

(52) U.S. Cl.
CPC ....... *B60L 11/1864* (2013.01); *B60L 11/1861* (2013.01); *H02J 7/0029* (2013.01); *H02J 7/34* (2013.01); *H02J 9/002* (2013.01); *H02J 9/06* (2013.01); *H02J 2009/007* (2013.01)

(58) Field of Classification Search
CPC combination set(s) only.
See application file for complete search history.

(56) References Cited

U.S. PATENT DOCUMENTS

| | | | |
|---|---|---|---|
| 8,575,940 B2* | 11/2013 | Yugou | ...................... B60L 3/04 307/10.1 |
| 2012/0126751 A1 | 5/2012 | Cassidy | |
| 2012/0322431 A1 | 12/2012 | Kil et al. | |
| 2015/0280493 A1* | 10/2015 | Cha | ...................... H02J 7/0029 307/64 |

FOREIGN PATENT DOCUMENTS

| | | |
|---|---|---|
| EP | 1 077 520 A2 | 2/2001 |
| EP | 1 518 774 A1 | 3/2005 |
| EP | 1 557 927 A2 | 7/2005 |
| EP | 1 748 530 A2 | 1/2007 |
| KR | 10-2004-0039623 A | 5/2004 |
| KR | 10-2013-0032504 A | 4/2013 |

OTHER PUBLICATIONS

Extended European Search Report dated Oct. 4, 2016 in Corresponding European Patent Application No. 16169196.9.
European Examination report issued by the European Patent Office dated Mar. 6, 2018 in the examination of the European Patent Application No. 16 169 196.9.

* cited by examiner

*Primary Examiner* — An Luu
(74) *Attorney, Agent, or Firm* — Lee & Morse, P.C.

(57) ABSTRACT

An electric transfer apparatus includes a controller that maintains power to a user interface of an electronic device when a contact failure occurs for a battery pack used to power the electronic device. The power may be maintained by connecting an auxiliary storage to the user interface when the contact failure occurs. A controller may control a switch to selectively connect the user interface to the battery pack or auxiliary storage.

17 Claims, 2 Drawing Sheets

ELECTRIC TRANSFER APPARATUS AND CONTROL METHOD THEREOF

CROSS-REFERENCE TO RELATED APPLICATION

Korean Patent Application No. 10-2015-0065555, filed on May 11, 2015, and entitled, "Electric Transfer Means and Control Method Thereof," is incorporated by reference herein in its entirety.

BACKGROUND

1. Field

One or more embodiments described herein relate to an electric transfer device and a method for controlling an electric transfer device.

2. Description of the Related Art

Systems for storing and efficiently using power continues to be of interest, along with the formation of new or improved renewable energy sources that not pollute the environment. Part of this effort involves the design and use of rechargeable batteries for powering portable electronic devices (e.g., cellular phones, notebook computers, camcorders, and personal digital assistants) and electric transfer apparatuses (e.g., electric bicycles, electric motorcycles, and electric vehicles).

Various types of rechargeable batteries have been developed and have been connected to form a battery pack to meet the power requirements of a host device. One type of battery pack is used to power electric transfer apparatuses such as previously described. The battery pack can be charged and discharged and outputs power to a load, e.g., a motor or other driver of the apparatus. The battery pack used is managed by a controller and is connected to a user interface, e.g., an electronic dashboard on an electric bicycle. The user interface receives a voltage from the battery pack and displays corresponding information.

When a contact failure of the battery pack occurs, connection between the battery pack and the load (e.g., motor or driver) and/or the user interface may be cut off. Such a contact failure may occur, for example, when the electric bicycle travels along an uneven road surface. The vibration and impact caused by the uneven road surface may cause the battery pack to separate from the electric bicycle. In this case, power from the battery pack to the load and dashboard is disrupted.

When a contact failure occurs, the motor may still be driven by an accelerator pedal or bicycle pedal. When the contact failure is repaired, the battery pack may resume supplying power to the driver. However, when power to the user interface is stopped even once, the user interface will not work until a power switch of the user interface is manually pressed again.

SUMMARY

In accordance with one or more embodiments, an electric transfer apparatus includes a battery pack; a driver connected to the battery pack; a user interface connected to the battery pack; an auxiliary storage connected to the user interface; a switch connected between the auxiliary storage and the driver; and a controller to control the battery pack and the switch, wherein the controller is to control the switch to be turned off when a contact failure of the battery pack occurs.

The controller may determine whether the contact failure of the battery pack has occurred based on whether a difference between a voltage between a positive terminal and a negative terminal of the battery pack at a first point of time and a voltage between the positive terminal and the negative terminal of the battery pack at a second point of time is equal to or greater than a predetermined first magnitude. The controller may control the switch to be turned on when the contact failure of the battery pack is eliminated. The controller may determine whether the contact failure of the battery pack has been eliminated based on whether a difference between a voltage between the positive terminal and the negative terminal of the battery pack at a third point of time and a voltage between the positive terminal and the negative terminal of the battery pack at a fourth point of time is equal to or greater than a predetermined second magnitude.

The controller and the user interface may receive power from the auxiliary storage when the contact failure of the battery pack occurs. The auxiliary storage may include a capacitor. The auxiliary storage may remove noise of the driver when the contact failure of the battery pack does not exist. The user interface may include an electronic dashboard. The electric transfer apparatus may be an electric bicycle, an electric motorcycle, or an electric vehicle.

In accordance with one or more other embodiments, a method for controlling an electric transfer apparatus includes determining whether a contact failure of a battery pack has occurred; when the contact failure of the battery pack has occurred, turning off a switch connected between an auxiliary storage and a driver; determining whether the contact failure of the battery pack has been eliminated; and when the contact failure of the battery pack has been eliminated, turning on the switch.

In accordance with one or more other embodiments, a controller for an electric transfer apparatus includes an interface; and control logic to maintain a supply of power to a user interface of the apparatus during a contact failure of a battery pack of the apparatus, wherein power from the battery pack to a driver of the electric transfer apparatus is disrupted during the contact failure, and the control logic is to output at least one control signal through the interface, the at least control signal to control output of power from an auxiliary storage to the user interface during the contact failure.

The control logic may control storage of power in the auxiliary storage when the contact failure does not exist. The control logic may output at least one first control signal through the interface to isolate the user interface from the driver and to allow the auxiliary storage to be the sole source of power to the user interface during the contact failure, and output at least one second control signal through the interface to operatively connect the driver to the user interface while the auxiliary storage is connected to the user interface, the at least one second control signal to allow the auxiliary storage to operate as a noise reducer when the contact failure does not exist. The at least one control signal may control a state of a switch between the user interface and the driver.

The auxiliary storage may include a capacitor to store a voltage to be supplied to the user interface during the contact failure. The electric transfer apparatus may be an electric vehicle. The user interface may include an electronic dashboard.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
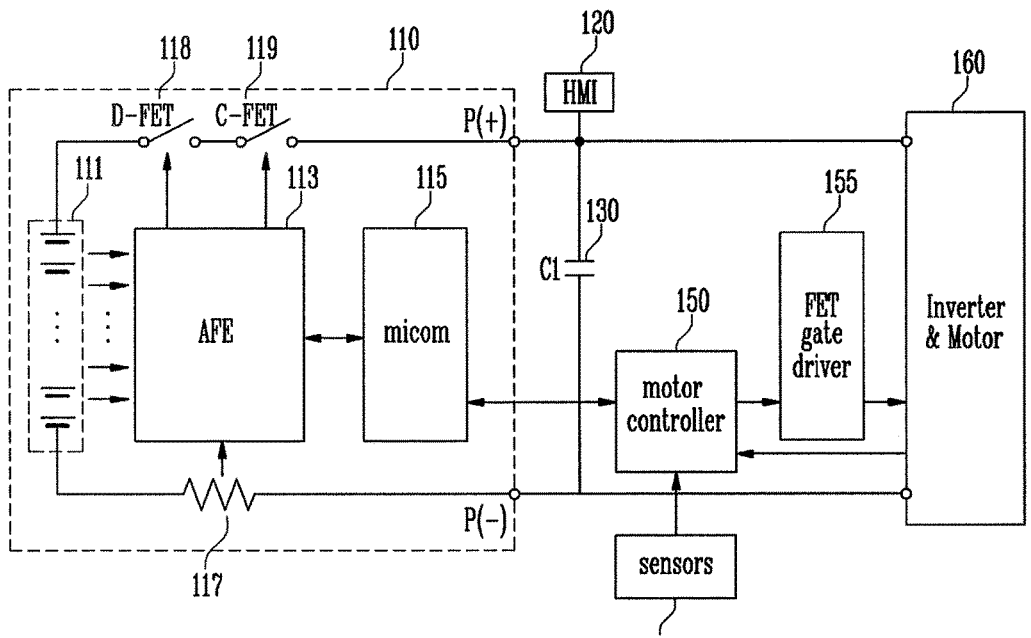
FIG. 1 illustrates one type of an electric transfer apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates one type of an electric transfer apparatus which includes a battery pack 110 which may be charged/discharged, a load 160 driven by power from the battery pack 110, a user interface 120 driven by power from the battery pack 110, and a controller 150 for controlling overall operations of the electric transfer apparatus.

The load 160 may include a driver, e.g., a motor or another type of driver. The user interface 120 includes an electronic dashboard or other type of display. The electronic dashboard 120 may display previously set information on a display unit based on user information and/or a previously set condition. The user interface 120 may be, for example, a human machine interface (HMI).

The load 160 and the user interface 120 receive power from the battery pack 110 and operate according to a previously set condition. For example, the load 160 may drive the electric transfer apparatus at a predetermined speed by driving the motor according to power from the battery pack 110. The user interface 120 may display predetermined information on the display unit using power from the battery pack 110. The user may set an operation of the electric transfer apparatus through an input unit of the user interface 120 and/or may set information to be displayed on the display unit.

The controller 150 controls operations of the electric transfer apparatus. For example, the controller 150 may calculate the voltage for the driver 160 according to a speed of the electric transfer apparatus, and may control the battery pack 110 to output the calculated voltage to the driver 160.

The electric transfer apparatus may include one or more sensors 170 for sensing various operations and conditions of the electric transfer apparatus. The controller 150 controls the electric transfer apparatus based on the sensed information. For example, the sensor(s) 170 may sense information on an inclination angle where the electric transfer apparatus is currently being driven. When the inclination angle exceeds a predetermined value, the controller 150 may control the battery pack 110 to output a higher voltage to the driver 160 to increase speed/acceleration. (The controller 150 may be referred to as a motor controller because the controller 150 controls operations of the electric transfer apparatus). A field effect transistor (FET) gate driver 155 may be included in or provided separately from the controller 150.

The battery pack 110 includes a battery cell 111, an analog front end (AFE) 113, a micro controller (micom) 115, and battery pack switches 118 and 119. The battery cell 111 may include one or two or more battery cells and various rechargeable secondary batteries may be used as the battery cells. For example, the secondary batteries may be, for example, nickel-cadmium batteries, lead storage batteries, nickel metal hydride batteries, lithium-ion batteries, or lithium polymer batteries.

The AFE 113 is connected to the battery cell 111 and controls charging and discharging of the battery cell 111. In performing these operations, the AFE 113 monitors the charge/discharge state of the battery cell 110, e.g., current flow state, a voltage, a current, a temperature, a remaining power amount, a lifespan, a state of charge (SOC), etc. The AFE 113 transmits data obtained by sensing the state of the battery cell 111 to the micro controller 115. The sensed data may include, for example, temperature data, voltage data, and/or current data.

The AFE 113 operates based on the voltage of the battery cell 111. For example, the AFE 113 receives a command signal from the micro controller 115 and generates a charge control signal or a discharge control signal according to the received command signal, to thereby control the on/off states of the battery pack switches 118 and 119. A plurality of AFE 113 may be included and connected in series. Alternatively, the AFE 113 may be included in a single IC.

The micro controller 115 controls operations of the battery pack 110. For example, the micro controller 115 controls operation of the AFE 113 and collects monitoring data from the AFE 113. The micro controller 115 may control other components connected thereto. For example, when a variation occurs between voltages of cells in the battery cell 111, the micro controller 115 may control a cell balancing operation in the AFE 113, for example, to set the voltages of the cells to be constant or to correspond to various levels. When the battery cell 111 is in an overcharge or overdischarge state, the micro controller 115 may stop the charge or discharge operation of the battery cell 111.

The charge switch 119 and the discharge switch 118 are connected in series on a high current path between the battery cell 111 and an external terminal P+. These switches control the flow of charge current and discharge current. The charge switch 119 cuts off charge current and the discharge switch 118 cuts off discharge current. Each of the charge switch 119 and the discharge switch 118 may include a field effect transistor (FET). The charge switch 119 and the discharge switch 118 may be controlled by the micro controller 115. Each of the charge switch 119 and the discharge switch 118 may include a parasitic diode. For convenience of illustration, the charge switch 119 may be referred to as a charge FET (C-FET), and the discharge switch 118 may be referred to as a discharge FET (D-FET).

A terminal P of the battery pack 110 may be connected to a charger for charging the battery cell 111 or an external device. The external device may be, for example, a load which consumes electrical energy stored in the battery cell 111. In the electric transfer apparatus, the driver 160 may be the external device.

The terminal P includes a positive electrode terminal P+ and a negative electrode terminal P−. The battery cell 111 is charged when the charger is connected to the terminal P. During charging, current flows to the battery cell 111 through the positive electrode terminal P+, and current flows out from the battery cell 111 through the negative electrode terminal P−. The battery cell 111 discharges when a load or external device is connected to the terminal P. During discharging, current flows out from the battery cell 111 through the positive electrode terminal P+, and current flows in the battery cell 111 through the negative electrode terminal P−. As shown in FIG. 1, the battery pack 110 may further include a shunt resistor 117.

The electric transfer apparatus may include a noise remover 130 connected in parallel to each of the battery pack 110 and the load 160. For example, the noise remover 130 may be connected between the positive electrode terminal P+ and the negative electrode terminal P− of the terminal P of the battery pack 110. The noise remover 130 removes noise generated in the motor of the driver 160 and may be implemented, for example, as a large-capacity capacitor.

The electric transfer apparatus may be, for example, an electric bicycle, an electric motorcycle, or an electric vehicle.

In operation, a contact failure of the battery pack 110 may occur in the electric transfer apparatus. The contact failure may occur when connection between the battery pack 110 and the load 160 and/or the user interface 120 is cut off. The connection may be cut off, for example, based on vibration and impact forces that occur when the electric transfer apparatus travels along an uneven road surface. When this occurs, the battery pack 110 may be separated from the electric transfer apparatus and supply of power from the battery pack 110 to the load 160 and the user interface 120 may be stopped or otherwise disrupted.

When a contact failure of the battery pack 110 in the electric transfer apparatus occurs, the driver 160 (e.g., motor) may be driven using, for example, an accelerator pedal (accelerator) or a bicycle pedal. When the contact failure of the battery pack 110 is repaired, supply of power to the driver 160 may resume. However, when the supply of power to the user interface 120 is stopped even once, the user interface 120 may not receive power again until the user again presses a power switch. For example, when the supply of power to the user interface 120 (e.g., a dashboard) is disrupted, the user interface 120 may operate again only after the user manually presses the power switch.

Figure 2:
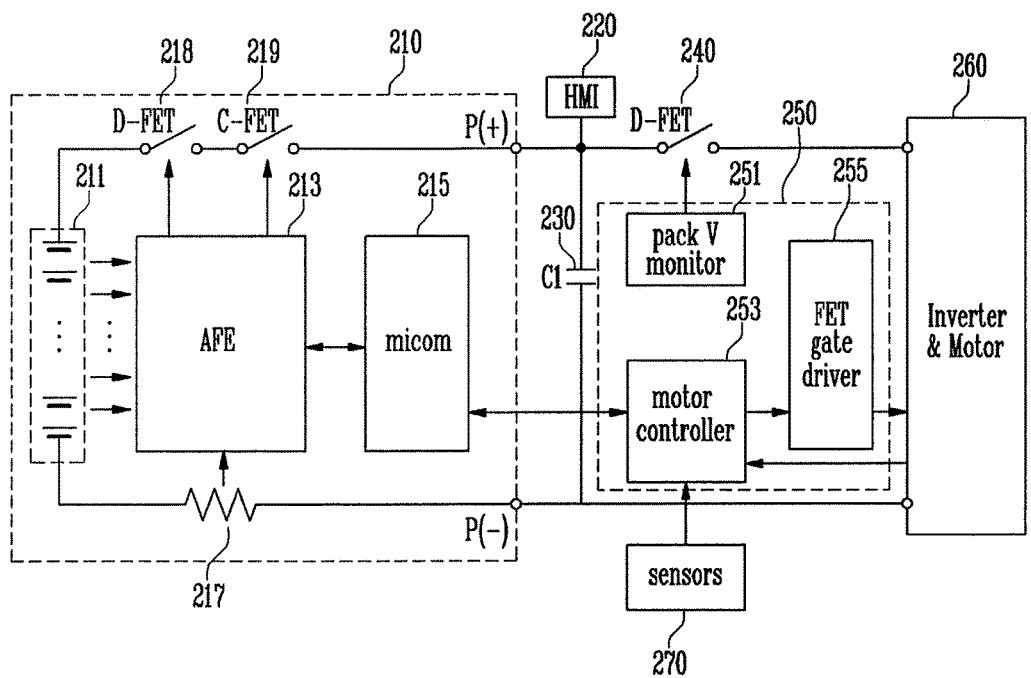
FIG. 2 illustrates an embodiment of an electric transfer apparatus.

FIG. 2 illustrates an embodiment of an electric transfer apparatus which includes a battery pack 210 which may be charged/discharged, a load 260 driven by power from the battery pack 210, a user interface 220 driven by power from the battery pack 210, an auxiliary storage 230 connected to the user interface 220, a switch 240 connected between the auxiliary storage 230 and the load 260, and a controller 250 for controlling operations of the electric transfer apparatus. The electric transfer means may be, for example, an electric bicycle, an electric motorcycle, or an electric vehicle. The electric transfer apparatus in FIG. 2 may have common features with the apparatus in FIG. 1, except, for example, as indicated below.

The load 260 may be a driver, e.g., a motor. The user interface 220 may include an electronic dashboard or other type of display. The electronic dashboard 220 displays previously set information on a display unit according to user information and/or a previously set condition. The user interface 220 may be an HMI.

When a contact failure of the battery pack 210 does not occur, the load 160 and the user interface 120 receive power from the battery pack 210 and to operate according to a previously set condition. For example, the load 260 may drive the electric transfer apparatus at a predetermined speed by driving the motor according to power from the battery pack 210. In addition, the user interface 120 may display predetermined information on the display unit using power from the battery pack 210. For example, a user may set an operation of the electric transfer apparatus through an input unit of the user interface 220 and/or may set information displayed on the display unit.

The controller 250 controls operations of the electric transfer apparatus. For example, the controller 250 calculates a voltage required in the driver 260 according to the speed of the electric transfer apparatus. The controller 250 controls the battery pack 210 to output the calculated voltage to the driver 260.

The electric transfer apparatus may further include one or more sensors 270, and the controller 250 may include an FET gate driver 255.

The battery pack 210 includes a battery cell 211, an AFE 213, a micro controller 215, and battery pack switches 218 and 219. The battery cell 211 includes one or two or more battery cells, and various types of rechargeable secondary batteries may be used as the battery cells. The AFE 213 is connected to the battery cell 211 and controls charging and discharging of the battery cell 211. The AFE 213 monitors the charge/discharge state of the battery cell 210, such as a current flow inside the battery pack 110, voltage, current, temperature, remaining amount of power, lifespan, state of charge (SOC), etc. The AFE 213 transmits data obtained by sensing the state of the battery cell 211 to the micro controller 215. The AFE 213 generates a charge control signal or a discharge control signal according to a command signal from the micro controller 215, to thereby control on/off states of the battery pack switches 218 and 219.

The micro controller 215 controls operations of the battery pack 210. For example, the micro controller 215 controls operation of the AFE 213 and collects monitoring data from the AFE 213. The micro controller 215 may control other components connected thereto.

The charge switch 219 and the discharge switch 218 are connected in series on a high current path between the battery cell 211 and an external terminal P+, to control the flow of charge current and discharge current. The charge switch 219 cuts off charge current, and the discharge switch 218 cuts off discharge current. Each of the charge switch 219 and the discharge switch 218 may include an FET. The charge switch 219 and the discharge switch 218 may be controlled by the micro controller 215 as described above.

A terminal P of the battery pack 210 may be connected to a charger for charging the battery cell 211 or an external device. The external device, as described in relation to FIG. 1, refers to a load which consumes electric energy stored in the battery cell 111. In the electric transfer apparatus of the present embodiment, the driver 260 may be the external device. The terminal P includes a positive electrode terminal P+ and a negative electrode terminal P−. The battery cell 211 is charged when the charger is connected to the terminal P and discharged when the external device is connected to the terminal.

As illustrated in FIG. 2, the battery pack 210 may include a shunt resistor 217.

The electric transfer apparatus may further include an auxiliary storage 230 for supplying an auxiliary voltage to the user interface 220 when a contact failure of the battery pack 210 occurs in the electric transfer apparatus.

For example, when impact forces are applied to the electric transfer apparatus, a contact failure may occur which separates electrical connection of the battery pack 210. The controller 250 determines whether the contact failure of the battery pack 210 has occurred and controls the auxiliary storage 230 to supply auxiliary voltage to the user interface 220. The controller 250 may transmit a message or signal including information that directs the auxiliary storage 230 to supply the auxiliary voltage to the user interface 220 when the contact failure of the battery pack 210 occurs.

The battery pack may include a battery pack voltage monitor 251 within or separate from the controller 250. For example, the controller 250 may determine whether a contact failure of the positive electrode terminal P+ and/or the negative electrode terminal P− of the battery pack 210 has occurred based on a measured voltage of the battery pack 210. In one embodiment, the battery pack voltage monitor 251 monitors the voltage between the positive electrode terminal P+ and the negative electrode terminal P− of the battery pack 210 periodically or when a previously set condition is satisfied. When the difference between a voltage of the terminal P of the battery pack 210 at a first point of time and a voltage of the terminal P of the battery pack 210 at a second point of time is equal to or greater than a predetermined first magnitude ($\Delta V1$), the battery pack voltage monitor 251 determines that the contact failure of the battery pack 210 has occurred. For example, when the voltage of the terminal P of the battery pack 210 is 15V at the first point of time, but the difference in voltage becomes 15V because the voltage of the terminal P of the battery pack 210 at the second point of time drops to 0V due to the occurrence of a voltage drop, the battery pack voltage monitor 251 may determine that a contact failure of the battery pack 210 has occurred.

When a contact failure occurs, the battery pack voltage monitor 251 controls (e.g., opens) the switch 240 to provide a charging voltage only to the user interface 220. For example, the auxiliary storage 230 may be connected to the user interface 220. The switch 240 may be positioned between the auxiliary storage 230 and the load 260. When the controller 250 determines that a contact failure of the battery pack 210 has occurred, the controller 250 prevents a voltage of the auxiliary storage 230 from flowing into the load 260 by turning off the switch 240.

When power to the load (driver) 260 has been disrupted, the load (driver) 260 may still be driven using an accelerator pedal or a bicycle pedal. However, power to the user interface 220 is maintained through the supply of an auxiliary voltage from the auxiliary storage, and this occurs even though power to the battery pack 210 has been disrupted. The switch 240 may include a D-FET and also a parasitic diode.

The auxiliary storage 230 may be connected in parallel to the battery pack 210, and may receive and store a voltage from the battery pack 210. The auxiliary storage 230 may supply power to the user interface 220 using the stored voltage, even when a contact failure of the battery pack 210 occurs.

The auxiliary storage 230 may be operate as a noise remover when a contact failure of the battery pack 210 does not exist. For example, the auxiliary storage 230 may be connected in parallel to each of the battery pack 210 and the load 260, e.g., the auxiliary storage 230 may be connected between the positive electrode terminal P+ and the negative electrode terminal P− of the terminal P of the battery pack 210. In this case, the auxiliary storage 230 may be or include a (e.g., large-capacity) capacitor to remove noise generated in the motor of the driver 260. Thus, the auxiliary storage 230 operates as the noise remover when a contact failure of the battery pack 210 does not exist and as an auxiliary power source of the user interface 220 when a contact failure of the battery pack 210 does exist.

After a contact failure of the battery pack 210 has occurred, the controller 250 may determine whether the contact failure of the battery pack 210 has been eliminated or repaired. For example, after the battery pack 210 has separated (e.g., due to impact, vibration, or other forces or defects), a user may reconnect the battery pack 210 to repair or eliminate the contact failure.

When it is determined that the contact failure of the battery pack 210 has been eliminated or repaired, the controller 250 may stop the auxiliary storage 230 from being the sole source of power to the user interface 220 and control the battery pack 210 to supply power to the user interface 220. The controller 250 may determine whether the contact failure of the positive electrode terminal P+ and/or the negative electrode terminal P− of the battery pack 210 has been eliminated by measuring a voltage of the battery pack 210. The battery pack voltage monitor 251 may monitor a voltage between the positive electrode terminal P+ and the negative electrode terminal P− of the battery pack 210 periodically or when a previously set condition is satisfied.

When the difference between a voltage of the terminal P of the battery pack 210 at a third point of time and a voltage of the terminal P of the battery pack 210 at a fourth point of time is equal to or greater than a predetermined second magnitude ($\Delta V2$), the battery pack voltage monitor 251 may determine that the contact failure of the battery pack 210 has been eliminated. For example, when the voltage of the terminal P of the battery pack 210 was 0V at the third point of time, but the difference in voltage becomes 15V because the voltage of the terminal P of the battery pack 210 at the fourth point of time rises to 15V due to occurrence of a voltage rise, the battery pack voltage monitor 251 may determine that the contact failure of the battery pack 210 has been eliminated.

The first magnitude ($\Delta V1$) of the difference in voltage for determining that the contact failure of the battery pack 210 has occurred may be equal to or different from the second magnitude ($\Delta V2$) of the difference in voltage for determining that the contact failure of the battery pack 210 has been eliminated. For example, the first magnitude ($\Delta V1$) may be greater than the second magnitude ($\Delta V2$) to lower the reference when the contact failure of the battery pack 210 has occurred. In another embodiment, the first magnitude ($\Delta V1$) may be smaller than the second magnitude ($\Delta V2$).

When it is determined that the contact failure of the battery pack 210 has been eliminated, the controller 250 may control the switch 240 to prevent the auxiliary storage 230 from being the sole source of voltage to the user interface 220. For example, the controller 250 may turn on the switch 240 between the auxiliary storage 230 and the driver 260. In this case, the auxiliary storage 230 operates as the noise remover based on its parallel connection to each of the battery pack 210 and the driver 260. The capacitor 230 may also be recharged during this time.

The controller 250 may be driven by the voltage stored in the auxiliary storage 230. In this case, the controller 250 may operate when a contact failure of the battery pack 210 occurs.

As illustrated in FIG. 2, the controller 250 may include the battery pack voltage monitor 251, a motor controller 253 for controlling operations of the electric transfer apparatus, and the FET gate driver 255. In another embodiment, the controller 250 may correspond to fewer than all or even one of the battery pack voltage monitor 251, the motor controller 253, and the FET gate driver 255. Also, only one controller (e.g., logic) may be used to perform all the operations of the battery pack voltage monitor 251, the motor controller 253, and the FET gate driver 255.

Figure 3:
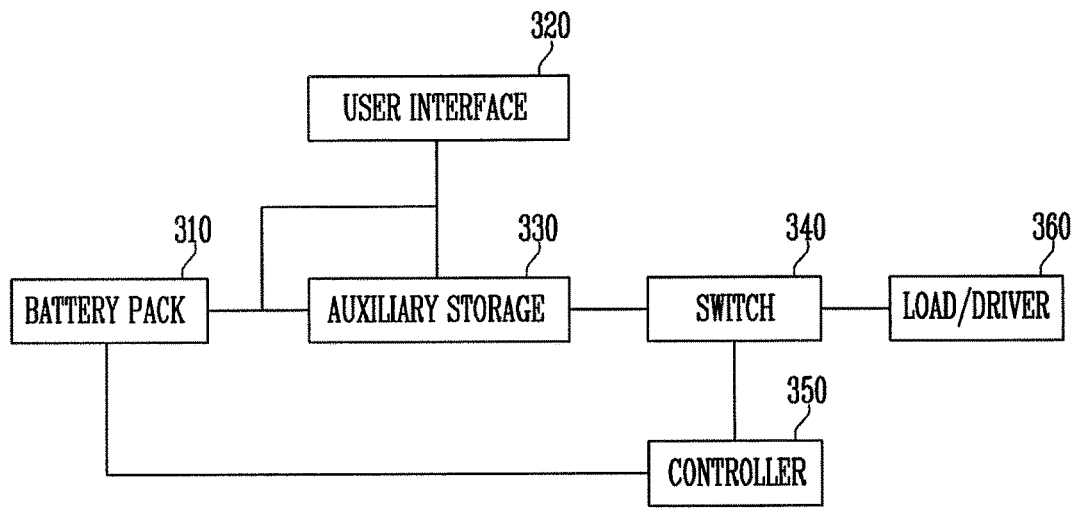
FIG. 3 illustrates another embodiment of an electric transfer apparatus.

FIG. 3 illustrates another embodiment of an electric transfer apparatus which includes a battery pack 310, a user interface 320, an auxiliary storage 330, a switch 340, a controller 350, and a load/driver 360. Operations of these components have been described in detail with reference to FIG. 2.

The battery pack 310 supplies power to the load 360 and the user interface 320. The auxiliary storage 330 is connected to the battery pack 310 and stores an auxiliary voltage during normal operation (e.g., when no contact failure exists) of the battery pack 310. Also, the auxiliary storage 330 is connected to the load/driver 360 to operate as a noise remover for removing noise of a motor. The auxiliary storage 330 may be implemented, for example, by a (e.g., large-capacity) capacitor.

When a contact failure of the battery pack 310 occurs, the controller 350 senses the contact failure and control the switch 340 to allow the auxiliary storage 330 to supply an auxiliary voltage to the user interface 320. For example, the controller 350 may turn off the switch 340 to prevent the voltage of the auxiliary storage 330 from being provided to the load/driver 360, as described above.

Subsequently, the controller 350 determines whether the contact failure of the battery pack 310 has been eliminated or repaired. When the contact failure of the battery pack 310 has been eliminated or repaired, the controller 350 turns on the switch 340 to allow voltage of the battery pack 310 to be provided to the load/driver 360, as previously described.

Figure 4:
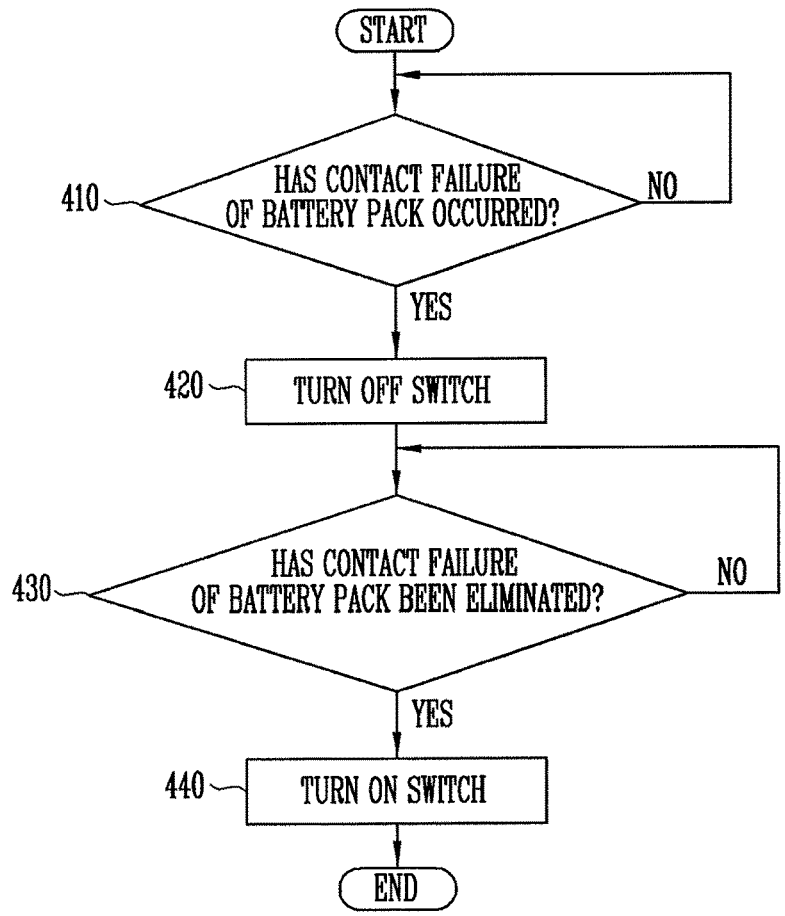
FIG. 4 illustrates a method for controlling an electric transfer apparatus.

FIG. 4 illustrates an embodiment of a method for controlling an electric transfer apparatus, which, for example, may be the electric transfer apparatus according to the aforementioned embodiments.

Referring to FIG. 4, in operation 410, a controller determines whether a contact failure of a battery pack has occurred. For example, the controller may measure a voltage between a positive electrode terminal P+ and a negative electrode terminal P− of a terminal P of the battery pack at a first point of time and a voltage between the positive electrode terminal P+ and the negative electrode terminal P− of the terminal P of the battery pack at a second point of time. The controller determines whether a contact failure has occurred based on whether the difference between the measured voltages is equal to or greater than a predetermined value.

When it is determined that the contact failure of the battery pack has occurred, in operation 420, the controller may turn off a switch between an auxiliary storage and a load/driver. Thus, a voltage of the auxiliary storage is supplied to a user interface. The voltage of the auxiliary storage is maintained to a predetermined level or more to prevent power of the user interface from being turned off.

Subsequently, in operation 430, the controller determines whether the contact failure of the battery pack has been eliminated or repaired. For example, the controller may measure a voltage between the positive electrode terminal P+ and the negative electrode terminal P− of the terminal P of the battery pack at a third point of time and a voltage between the positive electrode terminal P+ and the negative electrode terminal P− of the terminal P of the battery pack at a fourth point of time. The controller may determine whether the contact failure of the battery pack has been eliminated or repaired, based on whether the difference between the measured voltages is equal to or greater than a predetermined value.

When it is determined that the contact failure of the battery pack has been eliminated or repaired, the controller turns off the switch between the auxiliary storage and the load/driver. Thus, supply of voltage of the auxiliary storage to the user interface is stopped, and power of the battery pack is supplied to the load/driver and the user interface. In addition, the auxiliary storage may operate as a noise remover.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controller of the embodiments described herein may be implemented in logic which, for example, may include hardware, software, or both. When implemented at least partially in hardware, the controller may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controller may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

In accordance with another embodiment, a controller for an electric transfer apparatus includes an interface and control logic. The controller maintains a supply of power to a user interface of the apparatus during a contact failure of a battery pack of the apparatus. Power from the battery pack to a driver of the electric transfer apparatus is disrupted during the contact failure. The control logic is to output at least one control signal through the interface to control output of power from an auxiliary storage to the user interface during the contact failure.

The control logic controls storage of power in the auxiliary storage when the contact failure does not exist. The control logic outputs at least one first control signal through the interface to isolate the user interface from the driver and to allow the auxiliary storage to be the sole source of power to the user interface during the contact failure. The control logic outputs at least one second control signal through the interface to operatively connect the driver to the user interface while the auxiliary storage is connected to the user interface, the at least one second control signal to allow the auxiliary storage to operate as a noise reducer when the contact failure does not exist. The at least one control signal may control a state of a switch between the user interface and the driver.

The controller may correspond to controller 250 and/or may perform operations that correspond to the method embodiments disclosed herein. The auxiliary storage may include a capacitor to store a voltage to be supplied to the user interface during the contact failure. The user interface may include an electronic dashboard. The electric transfer apparatus may be an electric vehicle or any of the other types of apparatuses previously described.

The interface may take various forms. For example, when the control logic is embodied within an integrated circuit chip, the output may be one or more output terminals, leads, wires, ports, signal lines, or other type of interface without, within, or coupled to the control logic.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. An electric transfer apparatus, comprising:
    a battery pack;
    a driver connected to the battery pack;
    a user interface connected to the battery pack;
    an auxiliary storage connected to the user interface;
    a switch connected between the auxiliary storage and the driver; and
    a controller to control the battery pack and the switch, wherein the controller is to control the switch to be turned off when a contact failure of the battery pack occurs.

2. The apparatus as claimed in claim 1, wherein the controller is to determine whether the contact failure of the battery pack has occurred based on whether a difference between a voltage between a positive terminal and a negative terminal of the battery pack at a first point of time and a voltage between the positive terminal and the negative terminal of the battery pack at a second point of time is equal to or greater than a predetermined first magnitude.

3. The apparatus as claimed in claim 2, wherein the controller is to control the switch to be turned on when the contact failure of the battery pack is eliminated.

4. The apparatus as claimed in claim 3, wherein the controller is to determine whether the contact failure of the battery pack has been eliminated based on whether a difference between a voltage between the positive terminal and the negative terminal of the battery pack at a third point of time and a voltage between the positive terminal and the negative terminal of the battery pack at a fourth point of time is equal to or greater than a predetermined second magnitude.

5. The apparatus as claimed in claim 1, wherein the controller and the user interface are to receive power from the auxiliary storage when the contact failure of the battery pack occurs.

6. The apparatus as claimed in claim 1, wherein the auxiliary storage includes a capacitor.

7. The apparatus as claimed in claim 6, wherein, the auxiliary storage is to remove noise of the driver when the contact failure of the battery pack does not exist.

8. The apparatus as claimed in claim 1, wherein the user interface includes an electronic dashboard.

9. The apparatus as claimed in claim 1, wherein the electric transfer apparatus is an electric bicycle, an electric motorcycle, or an electric vehicle.

10. A method for controlling an electric transfer apparatus, the method comprising:
    determining whether a contact failure of a battery pack has occurred;
    when the contact failure of the battery pack has occurred, turning off a switch connected between an auxiliary storage and a driver;
    determining whether the contact failure of the battery pack has been eliminated; and
    when the contact failure of the battery pack has been eliminated, turning on the switch.

11. A controller for an electric transfer apparatus, comprising:
    an interface; and
    control logic to maintain a supply of power to a user interface of the apparatus during a contact failure of a battery pack of the apparatus, wherein the control logic is to output at least one control signal through the interface, the at least one control signal to control output of power from an auxiliary storage to the user interface during the contact failure and to disrupt output of power from the auxiliary storage to the driver during the contact failure.

12. The controller as claimed in claim 11, wherein the control logic is to control storage of power in the auxiliary storage when the contact failure does not exist.

13. The controller as claimed in claim 11, wherein the control logic is to:
    output at least one first control signal through the interface to isolate the user interface from the driver and to allow the auxiliary storage to be the sole source of power to the user interface during the contact failure; and output at least one second control signal through the interface to operatively connect the driver to the user interface while the auxiliary storage is connected to the user interface, the at least one second control signal to allow the auxiliary storage to operate as a noise reducer when the contact failure does not exist.

14. The controller as claimed in claim 11, wherein the at least one control signal is to control a state of a switch between the user interface and the driver.

15. The controller as claimed in claim 11, wherein the auxiliary storage includes a capacitor to store a voltage to be supplied to the user interface during the contact failure.

16. The controller as claimed in claim 11, wherein the electric transfer apparatus is an electric vehicle.

17. The controller as claimed in claim 16, wherein the user interface includes an electronic dashboard.

\* \* \* \* \*